United States Patent [19]
Stephens et al.

[11] 3,881,111

[45] Apr. 29, 1975

[54] METHOD AND APPARATUS FOR THE DETECTION OF NITRIC OXIDE

[75] Inventors: James B. Stephens, LaCresenta; Parameswar Mahadevan, Cerritos; Raymond L. Chuan, Altadena, all of Calif.

[73] Assignee: California Institute of Technology, Pasadena, Calif.

[22] Filed: Sept. 27, 1973

[21] Appl. No.: 401,262

[52] U.S. Cl. ............... 250/373; 250/356; 250/382; 250/383
[51] Int. Cl. .............................. G01t 1/16
[58] Field of Search ...... 324/33; 250/389, 373, 356, 250/432, 382, 383

[56] References Cited
UNITED STATES PATENTS

| | | | |
|---|---|---|---|
| 1,808,709 | 6/1931 | Blake | 250/356 |
| 2,901,625 | 8/1959 | Friedman et al. | 250/382 |
| 2,959,677 | 11/1960 | Robinson et al. | 324/33 |
| 3,171,028 | 2/1965 | Lovelock | 250/373 |
| 3,454,828 | 7/1969 | Yamane | 324/33 |
| 3,601,608 | 8/1971 | Randall | 250/373 |
| 3,713,773 | 1/1973 | Fontijn | 324/33 |

*Primary Examiner*—Harold A. Dixon
*Attorney, Agent, or Firm*—Eric T. S. Chung

[57] ABSTRACT

A method and apparatus for detecting the presence and quantity of nitric oxide is disclosed. A volume of gas being evaluated for the presence and quantity of nitric oxide is illuminated by a source of ultraviolet radiation to produce ionization of any nitric oxide present. Resulting nitric oxide ions are detected by means of an ion detection system. The source of ultraviolet radiation may be either a window or windowless device.

26 Claims, 2 Drawing Figures

METHOD AND APPARATUS FOR THE DETECTION OF NITRIC OXIDE

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72 Stat. 435; 42 U.S.C. 2457).

2. Field of the Invention

This invention generally relates to a method and apparatus for detecting the presence and quantity of nitric oxide gas. More particularly, the present invention concerns a photon emission system which ionizes nitric oxide gas, allows the resulting nitric oxide ions to be detected, and thereby provides an indication of both the presence and quantity of nitric oxide gas in a quantity of other gases being evaluated.

3. Description of the Prior Art

The concern of environmentalists, arising from the progressing and increasingly more hazardous pollution of air is believed to be well taken. It would be highly desirable to have a device and/or method that is useful for accurately detecting the presence and measuring the quantity of air pollutants. As is well known, oxides of nitrogen including nitric oxide and nitrogen dioxide are produced during the process of combustion due to the extreme heating of air and are among the primary components of polluted air.

The generation or production of oxides of nitrogen generally occurs, and is a function of, flame or combustion temperature. For example, at an approximate temperature of 2,300° K, oxides of nitrogen are known to be produced at a considerably higher rate and consequently in greater quantities than at lower temperatures. It is obvious that the production of oxides of nitrogen can be controlled or reduced substantially whenever the combustion process can be controlled to occur at and involve as low temperatures as is both efficient and feasible.

The temperatures at which combustion processes occur have heretofore been difficult to control accurately. Generally power production systems, electric power plants, auto engines and the like are operated at maximum efficiency in terms of fuel-to-air mixture. The problem is that such maximum efficiency also involves maximum operating temperatures and hence the maximum production of oxides of nitrogen. The alternatives to operating at maximum efficiency would be to operate with either a "lean" mixture or a "rich" mixture. Either alternative mixture would serve to decrease the temperature attendant to the combustion process. The "rich" mixture is the more undesirable of the two alternatives due to the greater consumption of fuel and for being less clean from the standpoint of production of hydrocarbons due to the incomplete combustion process. By comparison, the "lean" mixture is desirable from the standpoint of economy and air purity but such "lean" mixtures have in the past not been generally used due to the difficulty of controlling the mixture which will normally due to the difficulty of controlling the mixture which will normally result in the usual combustion system becoming extinguished in whole or in part when the mixture is too "lean."

An efficient and accurate means of detecting oxides of nitrogen such as nitric oxide will, however, permit accurate control and/or adjustment of the fuel-to-air mixture of a combustion process to successfully allow the appropriate rich or lean mixture to be used. Devices for detecting the presence and quantity of nitric oxide can also be used for any of the many monitoring functions that may be required to wage an effort against air pollution.

Detection of the production of excess amounts of nitric oxide has heretofore been performed by a chemical analysis involving apparatus that is fragile and generally having a short useful life when exposed to the severe environment of a duct of exhaust gases. Such prior art detection techniques have also been found to be expensive and to require the frequent services of very skilled technical personnel.

Accordingly, it would be highly desirable to have an effective and accurate method and/or apparatus for detecting oxides of nitrogen, which device can be readily deployed and maintained in close proximity to a combustion system such as a smokestack, exhaust pipe, etc., or in the field for ambient air monitoring.

OBJECTS AND SUMMARY OF THE INVENTION

It is a primary object of the present invention to provide a method and apparatus for accurately detecting the presence and quantity of nitric oxide in air.

It is another object of the present invention to provide a method and apparatus that is readily deployable in close proximity a combustion systems for the purpose of monitoring exhaust gases to detect nitric oxide produced in the combustion process.

It is a further object of the present invention to provide a method and apparatus that is useful for ambient air monitoring as a mobile unit or as a stationary installation which will detect amounts of oxides of nitrogen.

It is a further object of the present invention to provide a method and apparatus for the detection of nitric oxide and which will provide an electrical signal capable of being employed to automatically control the fuel-to-air mixture used in a combustion process being monitored.

It is a yet further object of the present invention to provide an efficient and economical method and apparatus for detecting nitric oxide in the inherently contaminated environment of combustion systems without the necessity of frequent maintenance.

Briefly described, the present invention involves a method and apparatus for detecting the presence and quantity of nitric oxide included in a gas sample by the selective ionization of nitric oxide gas.

More particularly, oxides of nitrogen are detected in accordance with the present invention by illuminating a gaseous sample under evaluation with ultraviolet radiation. Resulting nitric oxide ions are collected at, and measured by, an ion detection system which provides an accurate indication of the presence and quantity of nitric oxide in the gas sample. The output signals provided by the ion detection system may be used as desired to automatically effect any control such as of the fuel-to-air mixture used in the combustion process.

Further objects and the many attendant advantages of the invention may be best understood by reference to the following detailed description taken in conjunction with the accompanying drawings in which like ref-

DESCRIPTION OF THE PREFERRED EMBODIMENT

Figure 1:
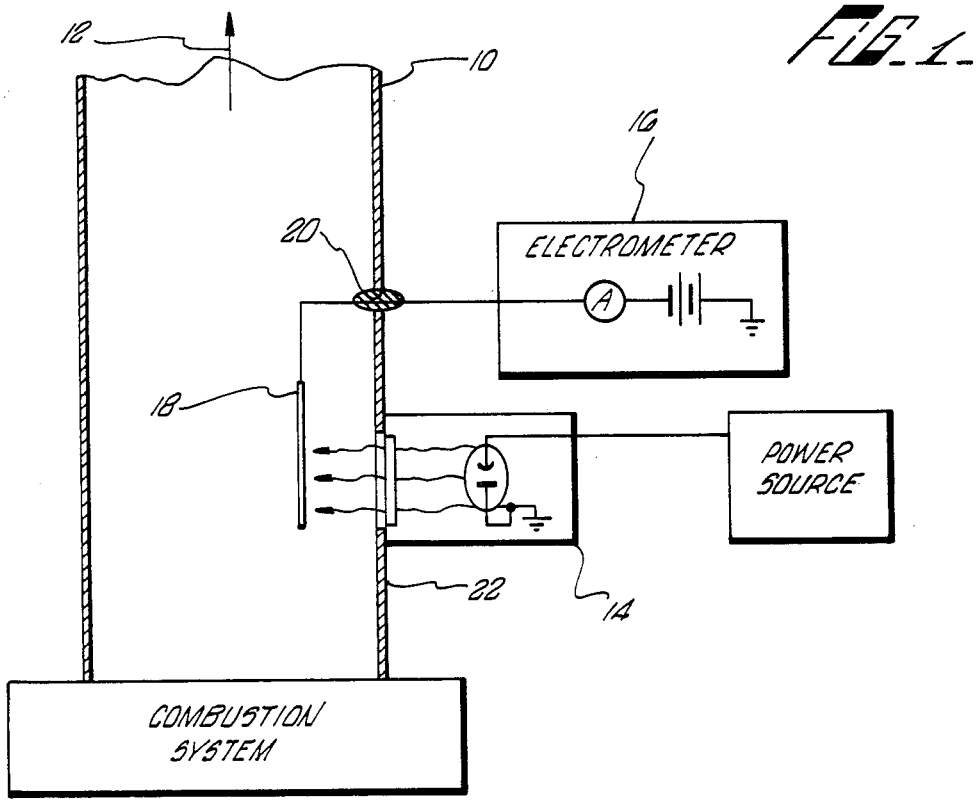
FIG. 1 is a schematic diagram illustrating an embodiment of a nitric oxide detector in accordance with the present invention.

Referring to the drawings, a smokestack, exhaust pipe or duct 10 is assumed to be situated to pass exhaust gases from a furnace, engine, or the like in which a combustion process is occurring. In the configuration of FIG. 1, the exhaust gases would pass in the direction indicated by an arrow 12. A nitric oxide detector in accordance with the subject invention would be positioned to extend into the interior of the duct 10, and hence into the stream of exhaust gas passing through the duct 10, to detect the presence and closely estimate the quantity of nitric oxide.

As illustrated, the embodiment of the subject invention shown by FIG. 1 would include a source of ultraviolet radiation 14 and an ion detection system including an electrometer 16 and an ion collector probe 18 which is extended through a suitable feed through 20 in the wall of the duct 10. The source 14 of ultraviolet radiation similarly would be situated to project ultraviolet radiation into the interior cavity of the duct 10 so as to illuminate gas in the neighborhood of the ion collector probe 18. As shown, any gas that passes between the ion collector probe 18 and the duct wall 22 in the area of the source 14 will be illuminated by ultraviolet radiation from the source 14. Nitric oxide gas included in the illuminated sample of gas will be ionized provided that the ultraviolet radiation is in a preselected range of wavelengths as is hereinafter described in greater detail. The resulting nitric oxide ions are collected by the ion collector probe 18 and thereby detected and measured by the electrometer 16.

The selective photoionization of the oxides of nitrogen necessary to the subject invention has been found to be possible due to the fact that very few of the normally occurring atomic or molecular species in the atmosphere or in combustion exhaust gases can be ionized by ultraviolet radiation in the wavelength range 1,200 to 1,300 A. In the present case, the fact that both nitric oxide (NO) and nitrogen dioxide ($NO_2$) are ionized presents a theoretical source of inaccuracy when the intention is to detect and measure the presence of nitric oxide. As is well known, the photoionization of nitrogen dioxide will occur at an ionization potential of 9.80 electron volts as compared to 9.25 electron volts for nitric oxide and since both ionization potentials are well within the 1,200 to 1,300 A. range of wavelengths of ultraviolet radiation selected for use with the subject invention, it may seem at first glance that the ionization of nitrogen dioxide will interfere with the accurate detection of nitric oxide. However, this has not been found to be the case in that the amount of nitrogen dioxide included in hot exhaust gases is negligible, nitric oxide constituting over 90% of the oxides of nitrogen present. This holds true in that a number of known chemical reactions must occur in the decomposition and oxidation of nitric oxide in the process of forming nitrogen dioxide. As a result, the time intervals involved in such chemical reactions eliminates, as a practical matter, the significance of any inaccuracy that may be induced by the presence of nitrogen dioxide. It has also been found that positioning of the nitric oxide detector of the present invention in somewhat close proximity to the combustion device from which exhaust gases are being emitted, further decreases the likelihood of interference by nitrogen dioxide.

It should also be mentioned that ionization of nitric oxide can occur through a "double quantum" process. In such cases, ionization is generally achieved in two steps. The first involves photoabsorption which results in electrical excitation of the molecules which are raised to an intermediate state between the ground state and the ionization threshold. Absorption of a second photon by such an excited molecule forms the second step and leads to ionization. These double quantum processes are known to be generally many orders of magnitude less probable than the single quantum process involved in the subject invention and can thus be neglected for the purposes of this invention.

It is to be noted that should the subject invention be used to monitor ambient air conditions, that ions of nitric oxide as well as nitrogen dioxide would be detected and measured and would be desirable for being consistent with present day air quality criteria.

Any conventional source of ultraviolet radiation may be employed for the source 14. An example of a suitable ultraviolet source that is commercially available would be a sealed krypton lamp having a magnesium fluoride window. Such a lamp is presently manufactured by Ophthos Co., Rockville, MD. The ultraviolet radiation provided by such lamp is known to be at 1,236 A.

Figure 2:
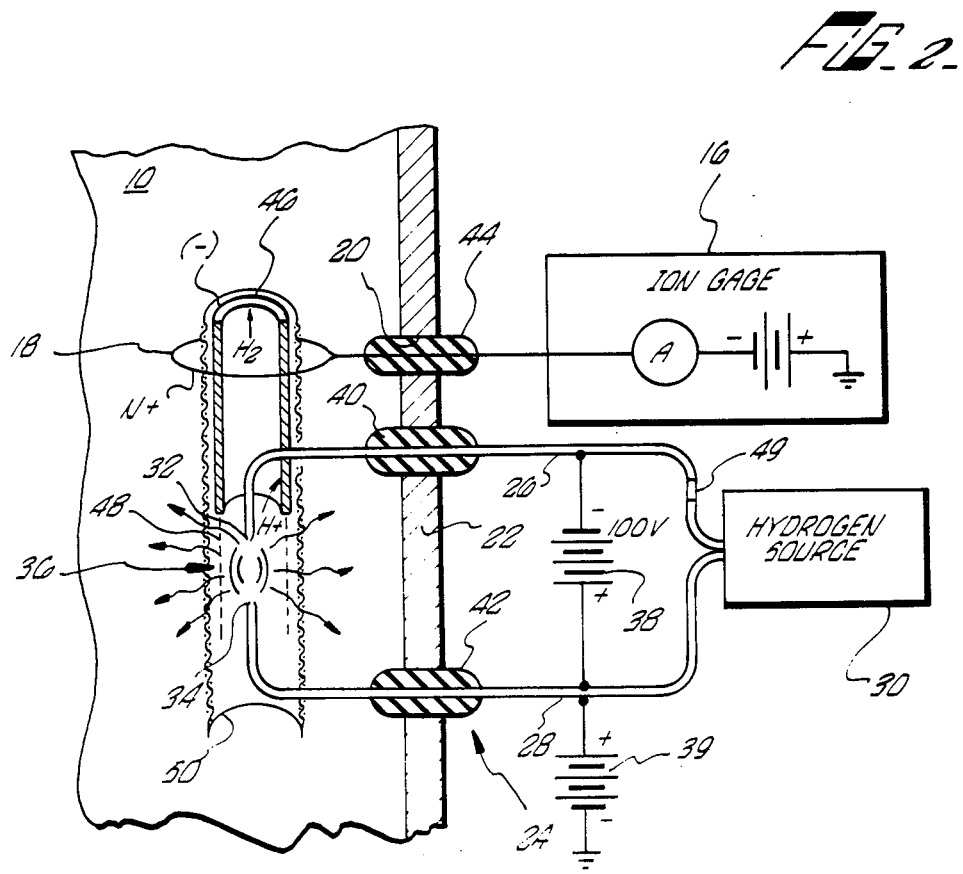
FIG. 2 is a schematic diagram illustrating another embodiment of a nitric oxide detector in accordance with the present invention.

The use of a sealed lamp for the ultraviolet source 14 is convenient from the standpoint of eliminating any need for handling bottled gases, or the like, as would be the case when a hydrogen arc is employed as is discussed in conjunction with the embodiment of FIG. 2. Such use of bottled hydrogen gas may be undesirable due to the potential for leakage, and the like; however, the use of a source 14 having a window through which ultraviolet radiation is emitted also presents the difficulty of having the window become contaminated and thereby reduce or block the passage of ultraviolet radiation therethrough to partially or fully frustrate the detection process.

The electrometer 16 may be any standard and readily available device well known in the prior art. As an example, Electrometer Model 610B, manufactured by Keithley Instruments, Inc., Cleveland, Ohio, would be suitable. Typically, an electrometer would include a current measuring device such as a nanoammeter which would be suitable for measuring nanoamperes. The ion collector probe 18 may typically be a platinum wire or the like. Any configuration may be used despite the illustrated probes being shown as a stub in FIG. 1 and a loop in FIG. 2. For example, an ion collector screen or grid may be used.

Since nitric oxide ions being detected are positive, the ion collector probe 18 would be maintained at a negative potential by a suitable D.C. source, i.e., 5–20 volts, that may be included as a part of the electrometer 16 such that the collection of positive ions on the ion collector probe 18 will cause the flow of current that is measured by the nanoammeter incorporated as a part of the electrometer 16. Needless to point out, the electric current signal that is measured by the electrometer 16 would be accurately indicative of the presence and amount of nitric oxide found in the exhaust gases resulting from a combustion process being monitored.

A description of the precise calibration and/or gas-to-signal ratios that may be applicable to the electrometer 16 is deemed unnecessary to the understanding of the subject invention and is therefore excluded herefrom.

Characterizing the embodiment of FIG. 1 as a "windowed" version of the subject invention, FIG. 2 may be characterized as a "windowless" embodiment of the subject invention. As shown, the source 14 of ultraviolet radiation depicted in FIG. 1 has been replaced by an arc source 24 for providing a hydrogen arc as a source of ultraviolet radiation. As is well known, such a hydrogen arc will produce what is commonly known as Lyman-alpha radiation having a wavelength of 1,216 A. A hydrogen arc source 24 may simply include a pair of capillary tubes 26 and 28 through which hydrogen gas is slowly fed, at a predetermined pressure such as 10 psi, from a hydrogen source 30 to a pair of juxtaposed nozzles 32 and 34 between which an arc 36 is maintained. As an example, hollow stainless tubes on the order of 0.010 inches outer diameter and 0.004 inches inner diameter may be used. A D.C. power supply 38 may be connected between the capillary tubes 26 and 28 so as to have the tubes 26 and 28 function as electrodes for the arc discharge system formed thereby. The tubes are electrically insulated from one another by a non-conductive element 49 which may itself serve as a section of the capillary tube 26. A suitable discharge can be established by using a potential on the order of a few hundred volts. A second D.C. power supply 39 may be connected to the capillary tube 28 as shown to maintain it at a preselected positive potential.

Insulators 40 and 42 may be situated within apertures in the duct wall 22 to electrically insulate tubes 26 and 28 from the duct wall through which such tubes extend. A similar insulator 44 may be used to electrically insulate the ion collector probe 18.

The ion collector probe 18 may be configured as a loop, ring, or the like, which is again mounted in close proximity to the source of ultraviolet radiation. As in the embodiment of FIG. 1, the ion collector probe 18 is negatively charged by a suitable power source included as a part of the electrometer 16 to have the positive nitric oxide ions migrate to and be attracted by the ion collector probe 18.

An inner tubular solid baffle 46 with a tubular depending screen 48 may be positioned within the loop of the ion collector probe 18 to shield the ion collector probe 18 from direct exposure to the ultraviolet radiation produced by the hydrogen arc 36. Such shielding eliminates the occurrence of surface ionization on said ion collector probe 18 and thereby eliminates the need for compensating therefor in interpreting measurements of said electrometer 16. The solid baffle 46 and depending screen 48 is maintained at a negative potential such as by being connected to the capillary tube 26 which is in turn connected to the negative terminal of the power source 38. The negatively charged depending screen 48 serves to contain the hydrogen plasma from the arc by containing the positive hydrogen ions which will then be passed upward through the tubular solid baffle 46 and thereby be ducted past the ion collector probe 18.

An outer tubular member 50 is positioned to concentrically surround the tubular solid baffle 46 and tubular depending screen 48. The outer tubular member 50 is maintained at a suitably positive potential such as may be accomplished by being attached to the capillary tube 28, and serves to electrically shield the tubular solid baffle 46 and tubular depending screen 48 from the positive nitric oxide ions that are formed exterior to the tubular solid baffle 46 and tubular depending screen 48. The positive nitric oxide ions are thereby prevented from being attracted to the tubular solid baffle 46 and tubular depending screen 48 rather than the ion collector probe 18. It is to be understood that any ions of nitrogen dioxide that may be formed would also be shielded from the baffle 46 and screen 48 situated within the outer tubular member 50.

The signals measured by the electrometer 16 in both embodiments may be suitably used in any manner well known to those persons having ordinary skill in the art to control the fuel-to-air mixture being used for the combustion process being monitored. An exemplary feedback control would involve the signals measured by the electrometer 16 being amplified as required and subsequently applied as an error or other feedback signal to control a servo-controlled air or fuel valve which may be connected to increase or limit the amount of air or fuel being fed to a burner or other combustion chamber. The use of feedback signals and servo valves is considered to be well known. Hence, a detailed explanation thereof is deemed unnecessary for the purpose of a clear description and understanding of the present invention and is therefore excluded herefrom.

From the foregoing discussion, it is now clear that the subject invention provides a method and apparatus for selectively photoionizing oxides of nitrogen and particularly nitric oxide such as would be found in hot exhaust gases whereby the resulting nitric oxide ions are detected to obtain an accurate indication of both the presence and quantity of nitric oxide included in a quantity of gas being monitored.

It is to be understood that the subject invention is useful for detecting nitric oxide in other applications besides the combustion systems referred to in the preceding description. For example, such devices could readily be positioned to detect nitric oxide in the atmosphere or in any other environment where it may be in either concentrated or diluted quantities. Hence, it is to be further understood that although the preceding description has primarily concerned source monitoring applications for the subject invention, that the subject invention is also suitable for use in monitoring ambient air conditions. When so used, both the nitric oxide and nitrogen dioxide in the air sample will be detected to give an indication of the total oxides of nitrogen in the air sample. Such information or data would be consistent with present day air quality criteria.

While a preferred embodiment of the present invention has been described hereinabove, it is intended that all matter contained in the above description and shown in the accompanying drawings be interpreted as illustrative and not in a limiting sense and that all modifications, constructions and arrangements which may fall within the scope and spirit of the invention may be made.

What is claimed is:

1. Apparatus for detecting the presence of oxides of nitrogen comprising:
   a source of ultraviolet radiation for ionizing oxides of nitrogen illuminated thereby;
   an ion detector positioned to collect ions of said oxides of nitrogen; and
   baffle means including first and second sections, said second section positioned for shielding said ion detector from direct incidence of ultraviolet radiation from said source, said first section positioned to electrically shield said second section from said ions of said oxides of nitrogen.

2. The apparatus defined by claim 1, said oxides of nitrogen being primarily nitric oxide.

3. The apparatus defined by claim 1, said source of ultraviolet radiation providing electromagnetic radiation having a wavelength in the range of 1,200 to 1,300 angstroms.

4. The apparatus defined by claim 1, said ion detector including:
   probe means for collecting ions of said oxides of nitrogen;
   means for maintaining said probe means at a negative potential; and
   means connected to said probe means for providing an indication of ions collected by said probe means.

5. The apparatus defined by claim 1, said source of ultraviolet radiation including means for providing a hydrogen arc.

6. The apparatus defined by claim 5, said means for producing a hydrogen arc including:
   a source of hydrogen gas;
   means for feeding said hydrogen gas from said source to a pair of electrodes between which an arc is found; and
   means for maintaining a predetermined electrical potential between said electrodes.

7. The apparatus defined by claim 6, said ion detector including:
   probe means for collecting ions of said oxides of nitrogen;
   means for maintaining said probe means at a negative potential; and
   means connected to said probe means for providing an indication of ions collected by said probe means.

8. The apparatus defined by claim 7, said baffle means being positioned for confining the plasma attendant to said hydrogen arc, said baffle means ducting excess hydrogen gas and hydrogen ions past said probe means and in isolation therefrom.

9. The apparatus defined by claim 8, said source of ultraviolet radiation providing electromagnetic radiation having a wavelength in the range of 1,200 to 1,300 angstroms.

10. The apparatus defined by claim 1, said ion detector including a probe configured to form a central opening, said source including a hydrogen arc, said first and second sections extending through said central opening of said probe to direct excess hydrogen gas and hydrogen ions past said probe and in isolation therefrom.

11. The apparatus defined by claim 10, said first and second sections being tubular, said second section being positioned within the first section.

12. The apparatus defined by claim 11, said first section being connected to be maintained electrically positive and said second section being connected to be maintained electrically negative.

13. The apparatus defined by claim 10, said second section including:
   a solid portion positioned for shielding said probe from direct incidence of ultraviolet radiation from said source; and
   a non-solid portion transmissive to ultraviolet radiation for confining the plasma attendant to said hydrogen arc.

14. The apparatus defined by claim 13, said first and second sections being tubular wherein said second section is axially positioned within said first section, said second section including a solid tubular position and a porous tubular portion both connected to be maintained electrically negative, said first section being porous and connected to be electrically positive, said first section electrically shielding said second section from positive ions of said oxides of nitrogen.

15. A nitric oxide detector adapted for placement in a duct through which gases are passed, said detector including:
   source means for irradiating said gases with ultraviolet radiation to ionize nitric oxide forming a part thereof to produce nitric oxide ions;
   collector means for collecting said nitric oxide ions; and
   baffle means including an inner section for preventing direct irradiation of said collector means by said ultraviolet radiation, and an outer section for electrically isolating said inner section from said nitric oxide ions.

16. The nitric oxide detector defined in claim 15 further including means for providing a quantitative indication of the nitric oxide ions collected by said means for collecting.

17. The nitric oxide detector defined by claim 15, said source means including a source of ultraviolet radiation having a wavelength in the range of 1,200 to 1,300 angstroms.

18. The nitric oxide detector defined by claim 17, said source of ultraviolet radiation including an enclosed lamp having a transparent window through which said radiation is directed to ionize nitric oxide illuminated thereby.

19. The nitric oxide detector defined by claim 17, said source of ultraviolet radiation including means for producing a hydrogen arc.

20. The nitric oxide detector defined by claim 19, said source being positioned within said inner section, the plasma attendant to said hydrogen arc being confined by said inner section, excess hydrogen gas and ions being ducted by said baffle means past said collector means and in isolation therefrom.

21. The nitric oxide detector defined by claim 20, said inner and outer sections being tubular, said inner section being positioned within the core of said outer section.

22. The nitric oxide detector defined by claim 21, said inner section including a solid portion and a porous portion, said outer section being porous to allow the propagation of ultraviolet radiation therethrough.

23. The nitric oxide detector defined in claim 22, said inner section being connected to be maintained electrically negative, said outer section being connected to be maintained electrically positive.

24. The nitric oxide detector defined by claim 17 further including:
   means for providing a quantitative indication of the nitric oxide ions collected by said means for collecting said nitric oxide ions; and
   means for maintaining said means for collecting said nitric oxide ions at a predetermined negative potential.

25. The nitric oxide detector defined by claim 15, said inner and outer sections being respectively connected to be electrically negative and positive, said inner section being positioned within said outer section.

26. The nitric oxide detector defined by claim 15, said collector means being configured to form a central aperture, said inner and outer sections extending through said aperture.

* * * * *